April 4, 1967     C. C. GREEN     3,311,983
MEASURING TAPE
Filed March 2, 1964
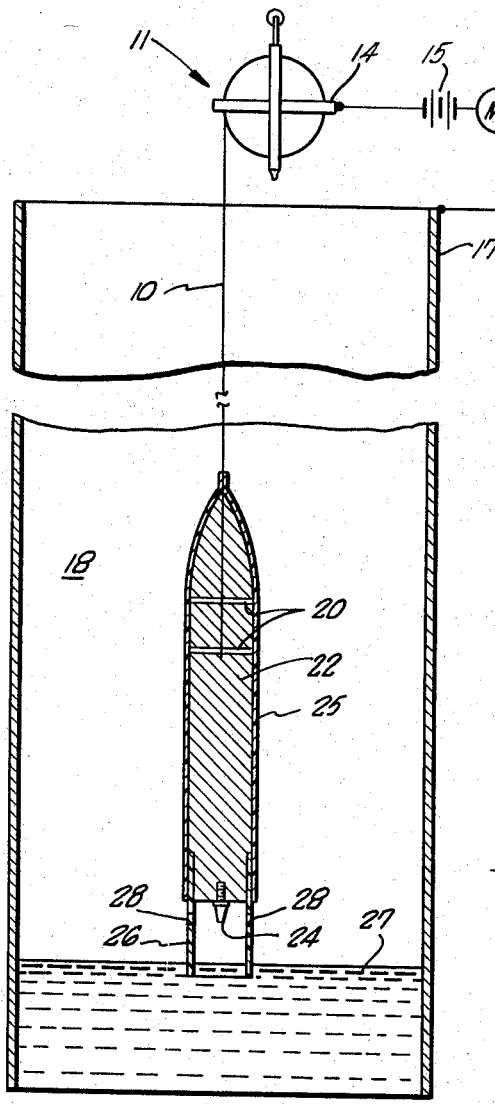
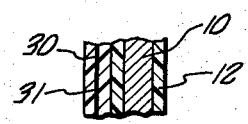
INVENTOR.
CHARLES C. GREEN
BY
*Christie, Parker & Hale*
ATTORNEYS

United States Patent Office 3,311,983
Patented Apr. 4, 1967

3,311,983
MEASURING TAPE
Charles C. Green 841 E. Whitcomb Ave.,
Glendora, Calif. 91740
Filed Mar. 2, 1964, Ser. No. 348,583
1 Claim. (Cl. 33—126.5)

This invention relates to a measuring tape.

The measuring tape of this invention has many different uses, but it is particularly useful for determining the water level in wells, and it is described with particular reference to that use.

The measuring tape of this invention includes an elongated flexible metal ribbon or tape which is marked for measuring distances. A transparent layer of organic material, such as plastic, is disposed on the tape to protect it from the elements and to insulate it electrically.

As is well known, many steel measuring tapes presently in use tend to corrode and pit so that reading the marks on them is often difficult after the tape has been in use. The transparent organic coating on the tape of this invention extends its useful life, and also makes it useful for well sounding.

In terms of a well sounder, the invention includes a metal tape with marks on it for measuring distance, and a transparent layer of electrical insulating material on the tape. A source of electrical power is also provided, and means are provided for connecting the source to the tape so that as the tape is lowered into the well, an electrical circuit is closed when the tape reaches the water level, a portion of the tape being exposed through the plastic layer for good electrical contact.

In the preferred form of the invention, a tape is wound on a reel and is connected at the end on the reel to the source of electrical power, which is also arranged to be connected to a well casing. An exposed electrode is provided at the other end of the tape to contact the water when the tape is lowered into a well. When the electrode touches the water, the circuit is completed through the well casing, and the flow of electrical current indicates the location of the water level, which is read directly off the tape through the transparent layer.

Preferably, an insulating shroud is disposed around and over the lower end of the tape or electrode to prevent premature contact of the electrode with water which may be pouring into the well from a point above the water level. In another form of the invention, a second insulated electrical conductor is secured to the tape and terminates at one end adjacent the electrode. The other end of the second conductor is adapted to be connected to the electrical source of power. Thus, when the tape and second conductor are lowered into water, current flows through the source and indicates the location of the water level. This arrangement is particularly useful when a well is completed with plastic or non-conducting casing, or is an open well where no casing is used.

These and other aspects of the invention will be more fully understood from the following detailed description and the accompanying drawings, in which:

FIG. 1 is a schematic fragmentary sectional elevation of the presently preferred embodiment of the invention;

FIG. 2 is an enlarged fragmentary sectional elevation showing a steel tape coated with a layer of plastic, and having a second insulated conductor secured to it; and FIG. 3 is a schematic sectional elevation of a reel showing how the second conductor tape of FIG. 2 is connected to the electrical power source.

Referring to FIG. 1, a steel tape 10 is wound on a conventional reel 11. The steel tape is coated with a transparent electrical insulating layer 12 (FIG. 2) of suitable plastic. A convenient way for coating the tape with plastic is to surround the tape with a plastic tubing made of heat-shrinkable irradiated polyolefin tubing known as Alphlex No. FIT–270. After the tubing is slipped over the tape, it is heated by infrared lamps or hot air blowers to a temperature of about 280° F. which causes it to shrink to a tight fit onto the tape. The upper end of the tape is electrically and mechanically connected to a conventional spool (not shown) in the reel. The spool is also electrically and mechanically connected to a frame 14 on the reel, and one terminal of a battery 15 is connected to the reel frame.

The other terminal of the battery is connected through a meter 16 to a metal casing 17 in a water well 18.

The free or lower end of the tape which is adapted to be lowered into the well, is electrically and mechanically connected by transverse metal pins 20 to the upper end of an elongated lead weight 22. An electrode tip 24 is screwed into the lower end of the lead weight. Preferably, the electrode tip is of a stainless steel metal alloy which has good resistance to corrosion.

A plastic coating 25 fits tightly around the lead weight and is sealed at its upper end to the plastic layer on the tape. A tubular sheath 26 of rigid plastic tubing is bonded to the lower end of the lead weight and extends down below the electrode tip to form a shroud which protects the tip from premature contact with water which may enter the well above the water level 27. A pair of vent holes 28 are formed in the upper portion of the shroud 26 adjacent the electrode to permit the escape of air that may be trapped in the shroud as the electrode is lowered toward the water.

In using the well sounder shown in FIG. 1, the electrical connections are made as shown and the tape is unwound to lower the lead weight into the well. The lowering of the tape is continued until the electrode tip reaches the water level, at which time the electrical circuit through the meter is completed to indicate the depth of the water level which can be read directly off of the tape, which carries conventional markings 29 (FIG. 3).

The advantage of the well sounder just described over conventional well sounders which use round wire is that the tape does not kink as will a circular wire, and there is no shortening of the tape due to kinking. Many well sounders have tabs attached to the wire for marking distances, and these tabs tend to slide or come off. This well sounder is free of that disadvantage. The tape passes down the well more readily than a wire because it is stiff and flat. This feature also permits the well sounder of this invention to be pushed nearly horizontally, which is an advantage for wells to which access is had only through lateral connections at the earth's surface. For example, this well sounder has been pushed nearly horizontally 30 feet with only a 5-foot drop to reach a well to determine the depth of water in it.

Another advantage of this well sounder is that the tape has a high tensile strength and can be pulled hard if necessary to free it when withdrawing it from the well.

A final and important advantage is that it provides a direct reading of water level and no subtraction is required as when the reading depends on observing where the tape is wetted by the water.

The embodiment shown in FIGS. 2 and 3 is useful where there is no good electrical connection through the well casing, such as where plastic casing is used. In this embodiment, a second conductor 30 insulated by a layer 31 of plastic is bonded to the exterior of the coated tape 10. A spool 32 (FIG. 3) on a conventional reel is split into a first half 33 and a second half 34. The two halves are bonded to a plastic insulating disk so that they rotate together. The metal tape is connected by a lead 36 to one half 34 of the spool, and the second conductor 30 is connected by a lead 37 to the other half 33 of the spool. The half 33 of the spool is connected through an axle 38 to a commutator 39 which is connected to one terminal of a battery 40, the other terminal of which is grounded. The half 34 of the spool is connected through an axle 41 to a commutator 42 grounded through a meter 43.

The apparatus shown in FIGS. 2 and 3 is similar to that of the apparatus of FIG. 1. However, with the apparatus of FIGS. 2 and 3, the tape and second conductor are lowered together. The lower end of the second conductor terminates at the same level as the electrode tip, the second conductor being bonded to the exterior of the lead weight. When the tape and second conductor are lower into water in a well, the circuit between them is complete and a signal is indicated by the meter 43.

I claim:

A well sounder comprising a metal tape having marks on it for measuring the level of water in a well, a transparent coating of electrical insulating material on the tape, a source of electrical power having two terminals, means for connecting one terminal of the source to the tape, a portion of the tape near one end being exposed to make electrical contact with water standing in a well as the tape is lowered into the well, means for connecting the other terminal of the power source to the water, an electrically insulating shroud disposed over the exposed portion of the tape to protect it from premature electrical contact before it reaches the level of the water in the well, the shroud having an opening to permit water to reach the exposed portion of the tape as it is lowered into the water, and means for indicating when current flows through the tape.

References Cited by the Examiner

UNITED STATES PATENTS

| | | | |
|---|---|---|---|
| 1,497,178 | 6/1924 | Lorenz | 33—126.5 |
| 1,498,960 | 6/1924 | Gardner | 33—126.5 |
| 2,275,474 | 3/1942 | Scaramucci | 33—126.5 |
| 2,593,252 | 4/1952 | Booth | 33—126.5 |
| 2,715,653 | 8/1955 | Reid | 136—100 |
| 2,997,878 | 8/1961 | Graham | 73—304 |

LEONARD FORMAN, *Primary Examiner.*

W. K. QUARLES, Jr., W. D. MARTIN,
*Assistant Examiners.*